United States Patent
Ootsuta et al.

(10) Patent No.: US 7,248,305 B2
(45) Date of Patent: Jul. 24, 2007

(54) LCD MODULE AND A COMBINATION SWITCH USING THE SAME

(75) Inventors: Kazuo Ootsuta, Tokyo (JP); Hiroshi Iwanaga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/030,187

(22) Filed: Jan. 7, 2005

(65) Prior Publication Data

US 2005/0117084 A1    Jun. 2, 2005

Related U.S. Application Data

(62) Division of application No. 10/076,354, filed on Feb. 19, 2002, now Pat. No. 6,853,432.

(30) Foreign Application Priority Data

Feb. 26, 2001    (JP)    ............................. 2001-050328

(51) Int. Cl.
G02F 1/1335    (2006.01)
G02F 1/1333    (2006.01)
(52) U.S. Cl. .......................................... 349/12; 349/58
(58) Field of Classification Search ................. 349/58, 349/12
See application file for complete search history.

(56) References Cited

U.S. PATENT DOCUMENTS

| 3,973,388 | A |   | 8/1976  | Yoshida et al. |
| 4,487,480 | A |   | 12/1984 | Nonomura et al. |
| 4,623,222 | A |   | 11/1986 | Itoh et al. |
| 4,826,297 | A |   | 5/1989  | Kubo et al. |
| 5,119,204 | A |   | 6/1992  | Hashimoto et al. |
| 5,659,376 | A | * | 8/1997  | Uehara et al. ................. 349/58 |
| 5,808,707 | A | * | 9/1998  | Niibori et al. ................. 349/60 |
| 5,835,139 | A | * | 11/1998 | Yun et al. ...................... 349/58 |
| 6,005,654 | A |   | 12/1999 | Kipfer et al. |
| 6,067,133 | A |   | 5/2000  | Niibori et al. |

FOREIGN PATENT DOCUMENTS

| JP | 62 176879    | 11/1987 |
| JP | 09 090316    | 4/1997  |
| JP | 09 146078    | 6/1997  |
| JP | 10-104418    | 4/1998  |
| JP | 2000-194004  | 7/2000  |

* cited by examiner

*Primary Examiner*—Toan Ton
(74) *Attorney, Agent, or Firm*—Young & Thompson (57) ABSTRACT

An LCD module is associated with a pair of switches, one of which is depressed by pressing the LCD module to swivel in a seesaw operation. The LCD module has a front panel having a larger thickness than and thus capable of protecting the LC layer and the rear panel against a reasonable external load for pressing the front panel for switching. The LCD module is suited for use in a portable terminal having a smaller space for switches and LCD module.

7 Claims, 10 Drawing Sheets

LCD MODULE AND A COMBINATION SWITCH USING THE SAME

CROSS REFERENCE TO RELATED APPLICATIONS

This application is a division of application Ser. No. 10/076,354, filed on Feb. 19, 2002, now U.S. Pat. No. 6,853,432 the entire contents of which are hereby incorporated by reference.

BACKGROUND OF THE INVENTION (a) Field of the Invention

The present invention relates to a liquid crystal display (LCD) module and, more particularly, to the structure of a combination switch including the LCD module.

(b) Description of the Related Art

In recent years, portable terminals, such as a portable data assistant or a mobile telephone, have been developed for achieving smaller dimensions and higher performances as well as excellent appearance using decorations. The higher performances should include higher functions of the portable terminals as well as simplification of the operation thereof. The simplification of the operations is partially achieved by large dimensions of a display module, such as an LCD module, which displays a guidance image for the operations.

In the circumstances as described above, the LCD module used in the portable terminal has increasingly larger dimensions. Among other parts of the portable terminal, the LCD module has a lower mechanical resistance against an external force, and thus is generally protected by an overcoat layer. The provision of the overcoat layer increases the thickness of the portable terminal, however. In addition, increase of the number of operations in the portable terminal may necessitate allocation of a single switch button to a plurality of functions, which complicates the operation itself of the portable terminal and confuses the user.

The display on the LCD module of the portable terminal is generally switched for providing a variety of operational information in view of the increase of the number of functions and services provided by the portable terminal. Examples of such a switching of the display for the operational information include a switching between a waiting mode at which the LCD module displays time information, residual battery power, antenna sensitivity or mode information such as a manner mode or vibration mode of the portable terminal, and a calling mode at which the LCD module displays a telephone number. The switching of the display on the LCD module is implemented by a changeover switch which switches between a plurality of installed programs.

The increase in the functions of the portable terminal necessitates an increase in the display area of the LCD module in the portable terminal. The provision of the changeover switch as well as provision of a number of other operational switches on a housing or casing of the portable terminal decreases the area of the housing to be allocated to the LCD module. Thus, a trade-off arises between a larger display area for the LCD module and the provision of a number of operational switches.

JP Patent No. 3019893 is directed to a camera having an installed zoom lens and implies a solution for the trade-off in the portable terminal as described above. The described camera includes a substrate, an LCD module formed thereon, and a changeover switch or seesaw switch mounted on the substrate for switching the zooming direction of the zoom lens. The substrate further mounts thereon a large number of electric interconnections.

The seesaw switch includes a pair of electric contacts sandwiching therebetween the LCD module and normally urged to a neutral position, and an arched lever made of a transparent material for allowing the LCD module to be observed therethrough and having a pair of protrusions which respectively abut against the electric contacts at the operating positions of the seesaw switch. The swivel axis of the lever of the seesaw switch extends parallel to the camera body or casing and overlies the center of the LCD module.

The seesaw switch effects abutment between each of the electric contacts and a corresponding one of the protrusions by a swivel operation, while allowing the zooming direction of the zoom lens to be observed on the LCD module. The LCD module is formed on a substrate, which is fixed onto the camera body, for indicating a variety of operational information including the zooming direction.

The described camera includes the lever of the seesaw switch, which also functions as a protective member for protecting the LCD module against an external force. This allows reduction of the total area for the operational switch and the LCD module, thereby solving the trade-off between the operational switches and the LCD module in the camera.

If the technique as described above is used in a portable terminal for solving the trade-off as described before, there arises a problem in that the structure of fixing the substrate mounting thereon the LCD module and the seesaw switch onto the camera body is complicated. In addition, the structure of the lever of the seesaw switch overlying the LCD module restricts the direction of the movement of the lever, which cannot be moved or slid in the direction parallel to the substrate because the sliding movement of the lever shields the end portions of the LCD module.

SUMMARY OF THE INVENTION

In view of the above problem in the conventional LCD module, it is an object of the present invention to provide a combination switch including an LCD module and an associated switch member capable of being operated by the movement of the LCD module without affecting the function of the LCD module.

It is another object of the present invention to provide an LCD module for use in such a combination switch.

The present invention provides a liquid crystal display (LCD) module including a transparent front panel, a rear panel and a liquid crystal (LC) layer sandwiched between the transparent front panel and the rear panel, the transparent front panel having a central area opposing areas of the LC layer and the rear panel and a peripheral area extending from the central area, the transparent front panel acting as an overcoat for protecting the LC layer and the rear panel against a reasonable external force.

The present invention also provides a combination switch structure including: a liquid crystal (LCD) module including a transparent front panel, a rear panel and a liquid crystal (LC) layer sandwiched between the transparent front panel and the rear panel, the transparent front panel having a central area opposing areas of the LC layer and the rear panel and a peripheral area extending from the central area; and a switch member operated by a movement of the peripheral area when the transparent front panel is applied with an external force.

In accordance with the combination switch of the present invention, the trade-off between the number of switches and a larger area of the LC module can be solved due to the functions and the structure of the combination switch.

The above and other objects, features and advantages of the present invention will be more apparent from the following description, referring to the accompanying drawings.

BRIEF DESCRIPTION OF THE DRAWINGS

FIG. 2A, and a sectional view taken along line C—C in FIG. 2A, respectively.

PREFERRED EMBODIMENTS OF THE INVENTION

Now, the present invention is more specifically described with reference to accompanying drawings, wherein similar constituent elements are mostly designated by similar reference numerals.

Figure 1A:
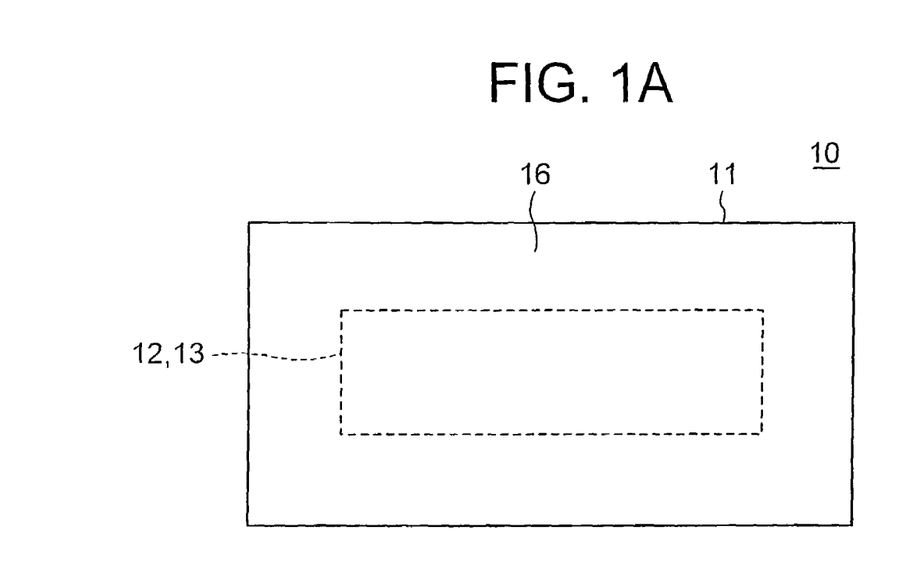
FIGS. 1A to 1C are a front view, a bottom view, and a side view, respectively, of an LCD module according to a first embodiment of the present invention.
Figure 1B:
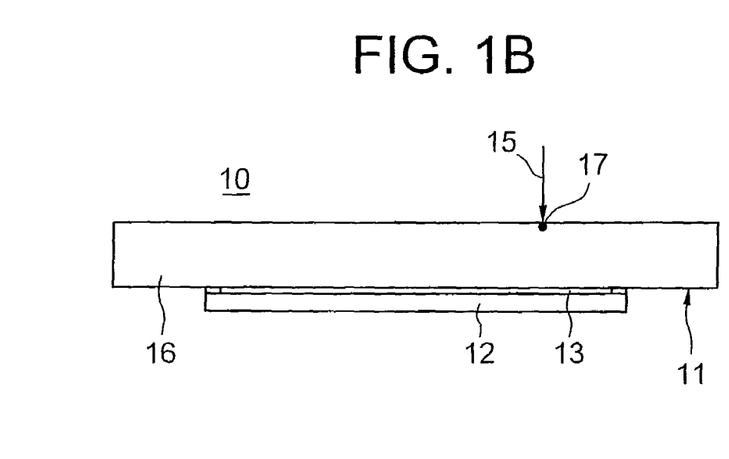
Figure 1C:
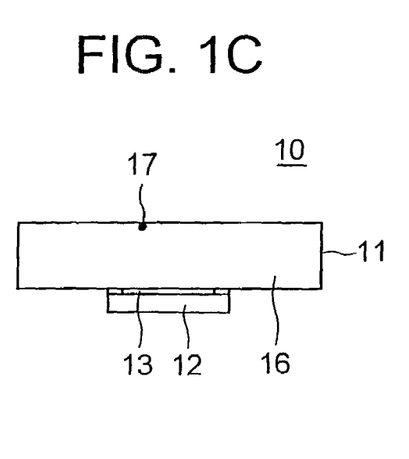

Referring to FIGS. 1A to 1C, an LCD module, generally designated by reference numeral 10, according to a first embodiment of the present invention includes a transparent front panel 11, a transparent rear panel 12, and an LC layer 13 sandwiched therebetween to form a unitary body of the LCD module 10. The rear panel 12 has a relatively small thickness, and may be made of a non-transparent material.

The front panel 11 has a function for protecting the LC layer 13 against a reasonable external load 15 generally applied to the portable terminal 10, such as a portable data assistant or a mobile telephone. As is well known, if the front panel 11 is deformed by the external load 15, the LC layer 13 is also deformed to affect the image passed by the LC layer 13. For prevention of such a deformation, the front panel 11 has a thickness sufficient for preventing the external load 15 from exerting an adverse influence to the LC layer 13. The front panel 11 has an area larger than the areas of the rear panel 12 and the LC layer 13, which are substantially same. The peripheral area 16 of the front panel 11 protruding from the edges of the rear panel 12 and the LC layer 13 is referred to as a flange 16 in this text, the flange 16 including four flange portions corresponding to the four edges of the LCD modules 10.

The term "external load" or "reasonable external load" as used herein means a load inadvertently applied to the portable terminal 10, such as a load applied when the user sits on a seat with the portable terminal 10 received in a rear pocket of trousers, a load applied by a luggage, for example, to the portable terminal 10 received in a leather bag, or a force applied by the gravity when the portable terminal 10 falls to the ground. Thus, the external load has an unspecified point of application on the transparent front panel. FIG. 1 shows such a point of application of the external force 15 by reference numeral 17.

Figure 2A:
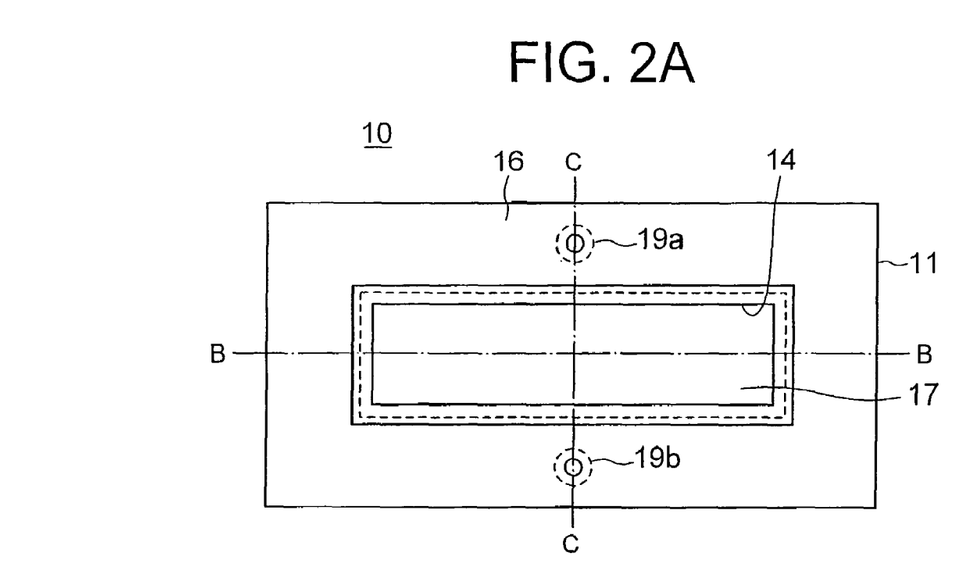
FIGS. 2A to 2C are a front view of an example of the LCD module of the first embodiment attached onto a casing, a sectional view taken along line B—B in FIG.
Figure 2B:
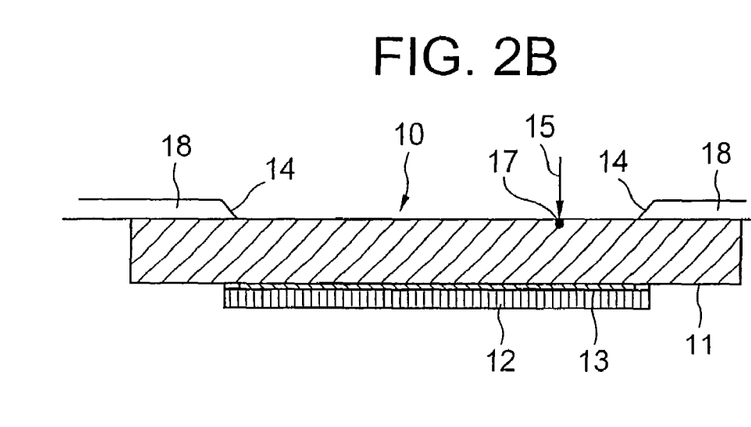
Figure 2C:
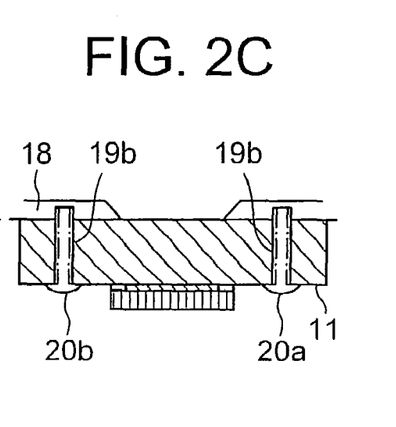

Referring to FIGS. 2A to 2C, when the LCD module 10 of the first embodiment is to be fixed onto a casing 18 having an opening 14, a pair of through-holes 19a and 19b formed in the front panel 11 at the flange portions thereof are used in combination with respective screws or bolts 20a and 20b. In this case, if a reasonable external load 15 is applied to the front panel 11 at an arbitrary point 17, the external load 15 hardly damages the LC layer 13 and the rear panel 12 due to substantially no deformation of the front panel 11 having a sufficient thickness.

Figure 3A:
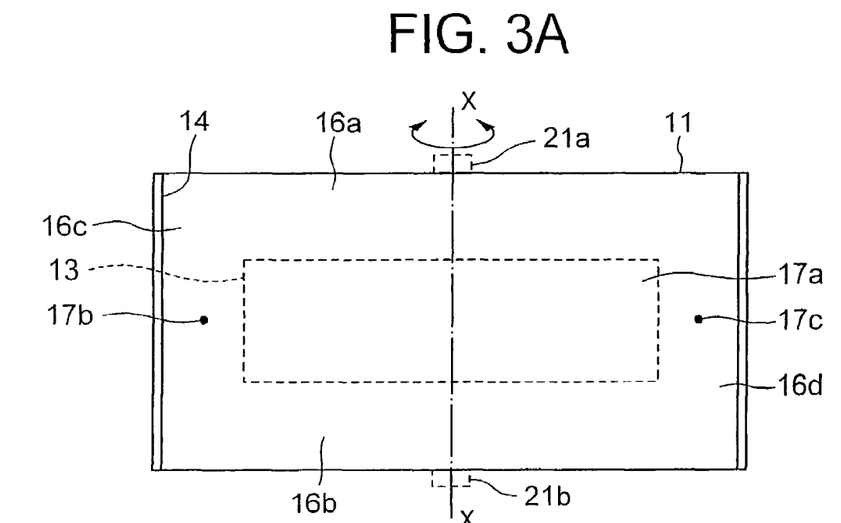
FIGS. 3A to 3C are a front view, a bottom view, and a side view, respectively, of another example of the LCD module of the first embodiment attached onto a casing.
Figure 3B:
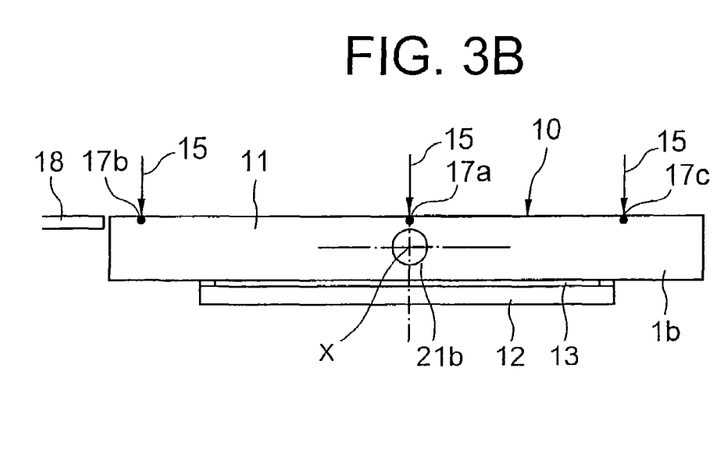
Figure 3C:
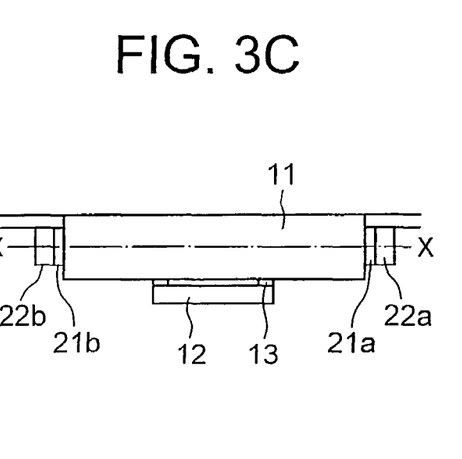

Referring to FIGS. 3A to 3C, the LCD module 10 of the first embodiment is attached onto a casing 18 having an opening 14 for allowing a swivel movement or seesaw movement of the LCD module 10 around a swivel axis X—X extending in the direction parallel to the front surface of the casing 18 or the front panel 11. The swivel axis X—X is implemented by a pair of protrusions 21a and 21b formed on the top and bottom of the front panel 11 at the flange portions 16a and 16b thereof. The pair of protrusions 21a and 21b are supported on a pair of bearings 22a and 22b fixed onto the casing 18 so that the LCD module 10 is allowed to move in a seesaw fashion around the swivel axis X—X with respect to the casing 18.

In the configuration of the combination switch of FIGS. 3A to 3C including the LCD module 10, an external load 15 applied onto the front panel 11 at a point 17a located in the vicinity of or on the axis X—X does not swivel the LCD module 10. In addition, the external load 15 does not substantially generate a deformation or damage on the rear panel 12 and the LC layer 13 due to the sufficient thickness of the front panel 11.

If an external load 15 is applied on the front panel 11 at a point 17b or 17c apart from the swivel axis X—X, the LCD module 10 is swiveled without involving a damage on the LCD module 10.

Figure 4A:
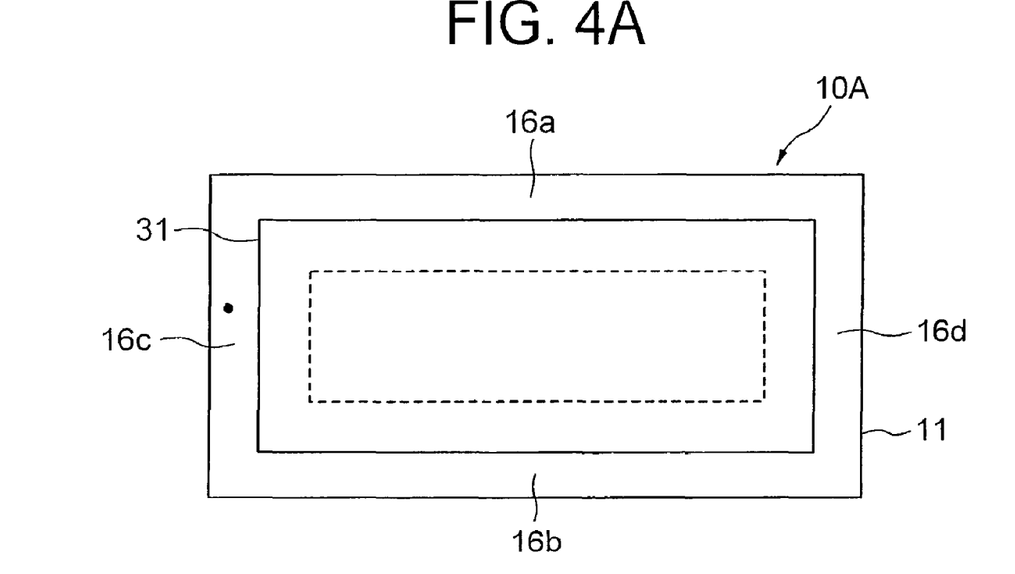
FIGS. 4A to 4C are a front view, a bottom view and a side view, respectively, of an LCD module according to a second embodiment of the present invention.
Figure 4B:
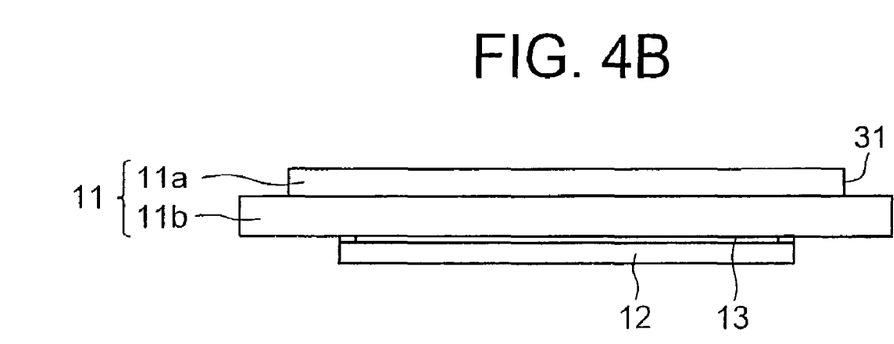
Figure 4C:
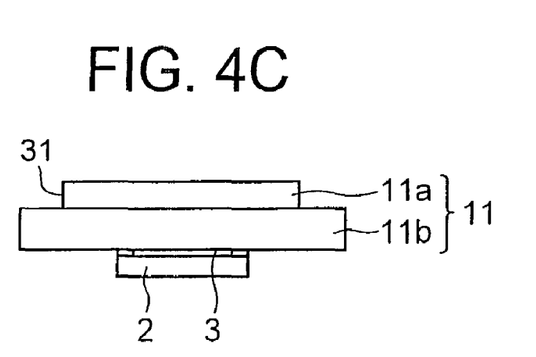

Referring to FIGS. 4A to 4C, an LCD module 10A according to a second embodiment of the present invention is similar to the LCD module 10 of the first embodiment except for a step 31 formed in the vicinity of the periphery of the front panel 10. The step 10 is such that the front portion 11a of the front panel 10 is smaller in size than the rear portion 11b of the front panel 10. In other words, the step 31 is formed by different thicknesses of the front panel 11, wherein the inner area of each flange portion 16a–16d of the front panel 11 has a larger thickness than the outer area of the each flange portion 16a–16d.

Figure 5A:
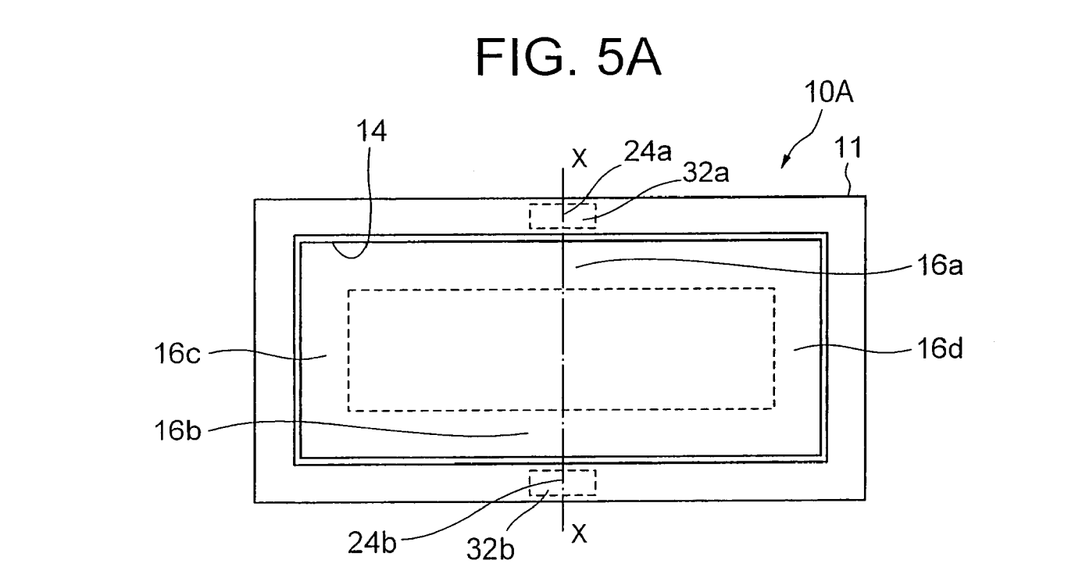
FIGS. 5A to 5C are front view, a bottom view and a side view of a combination switch including a seesaw switch in combination with the LCD module of the second embodiment.
Figure 5B:
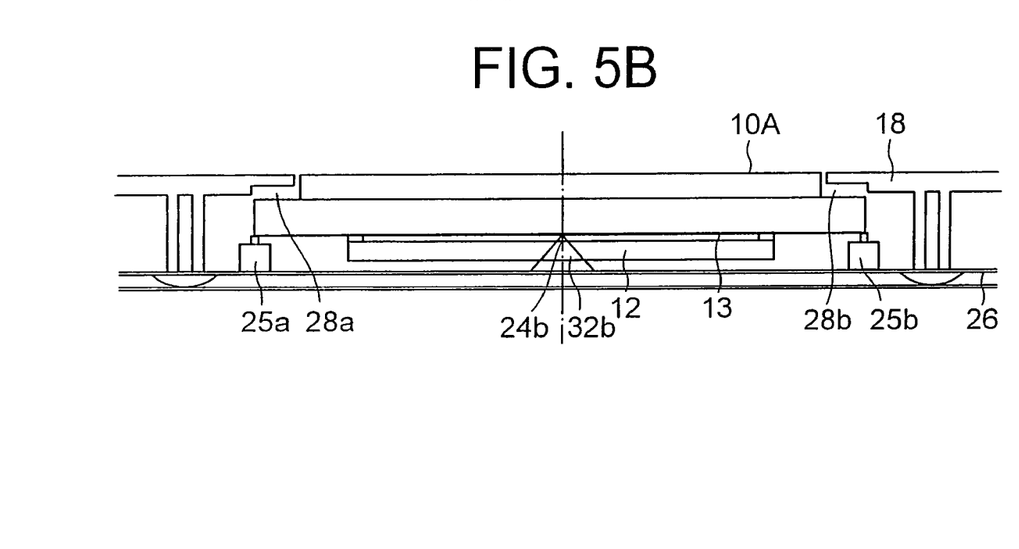
Figure 5C:
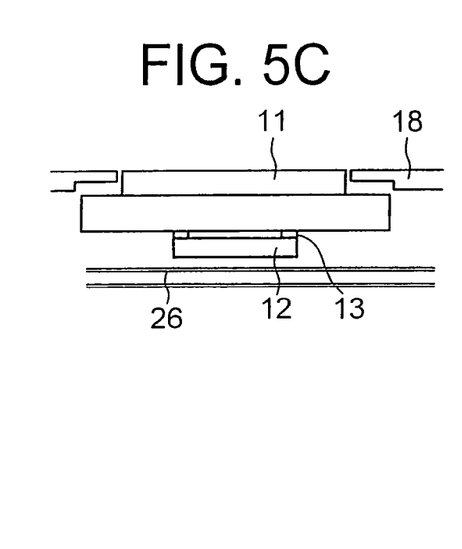

Referring to FIGS. 5A to 5C, the LCD module 10A of the second embodiment is attached onto a casing 18 having an opening 14 so that the LCD module 10A is allowed to swivel around the swivel axis X—X, with the front surface of the front panel 11 received in the opening 14. The swivel axis X—X is implemented by a pair of fulcrums 24a and 24b residing on the top and bottom flange portions 16a and 16b of the front panel 11 of the LCD module 10A. The front panel 11 is supported at both the side edges thereof by the casing 18 by means of a pair of springs 28a and 28b disposed between the casing 18 and the front surface of the flange portions 16a and 16b. The rear surface of the front panel 11 is supported against the springs 28a and 28b at the fulcrums 24a and 24b, located on the swivel axis X—X, by a pair of support members 32a and 32b formed on a substrate 26. The front surface of the central area of the front panel 11 is flush with the front surface of the casing 18 at the normal position of the LCD module 10A. The periphery of the front panel 11 having a lower thickness than the central area is received inside the casing 18.

A pair of changeover switches 25a and 25b are disposed on the substrate 26 at the locations where the right and left edges of the rear surface of the front panel 11 abut the changeover switches 25a and 25b after the swivel of the LCD module 10 for on/off operations of the switches 25a and 25b. The changeover switches 25a and 25b are used for switching between programs which display different information on the LCD module 10A.

It is to be noted that a pair of support members may be formed on the casing 18 for supporting the flange portions 16a and 16b of the front panel 11 instead of the support members 32a and 32b on the substrate 26. In such case, the fulcrums reside on the rear surface of the casing 18.

Figure 6A:
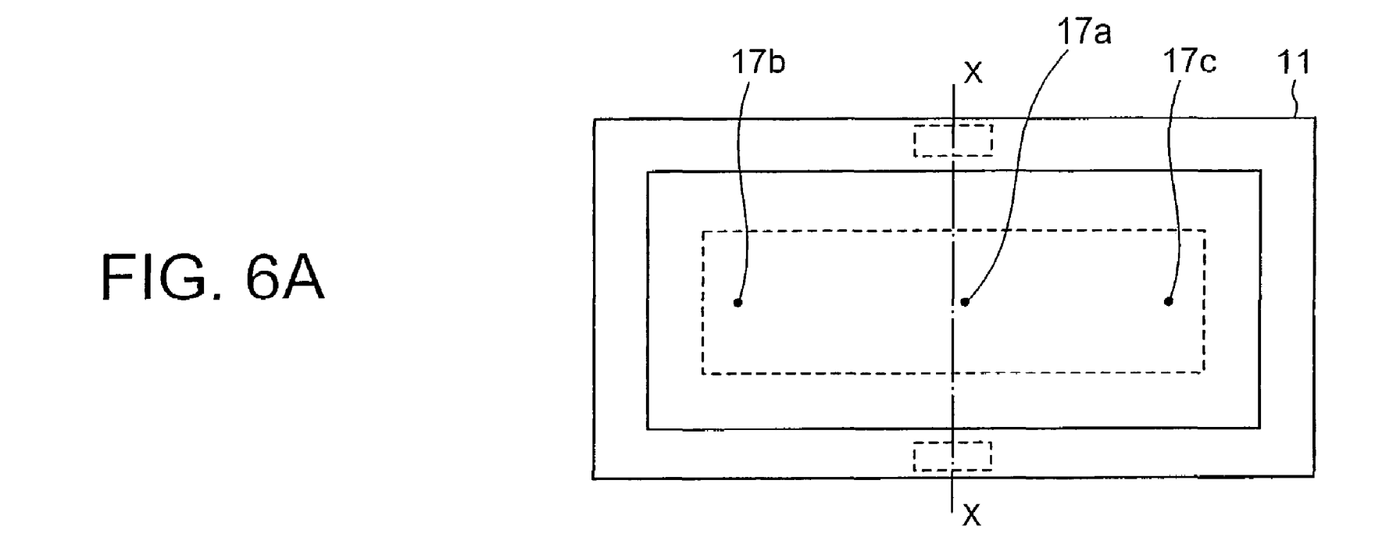
FIGS. 6A and 6B are front view and a bottom view, respectively, of the combination switch of FIGS. 5A to 5C, showing operation thereof.
Figure 6B:
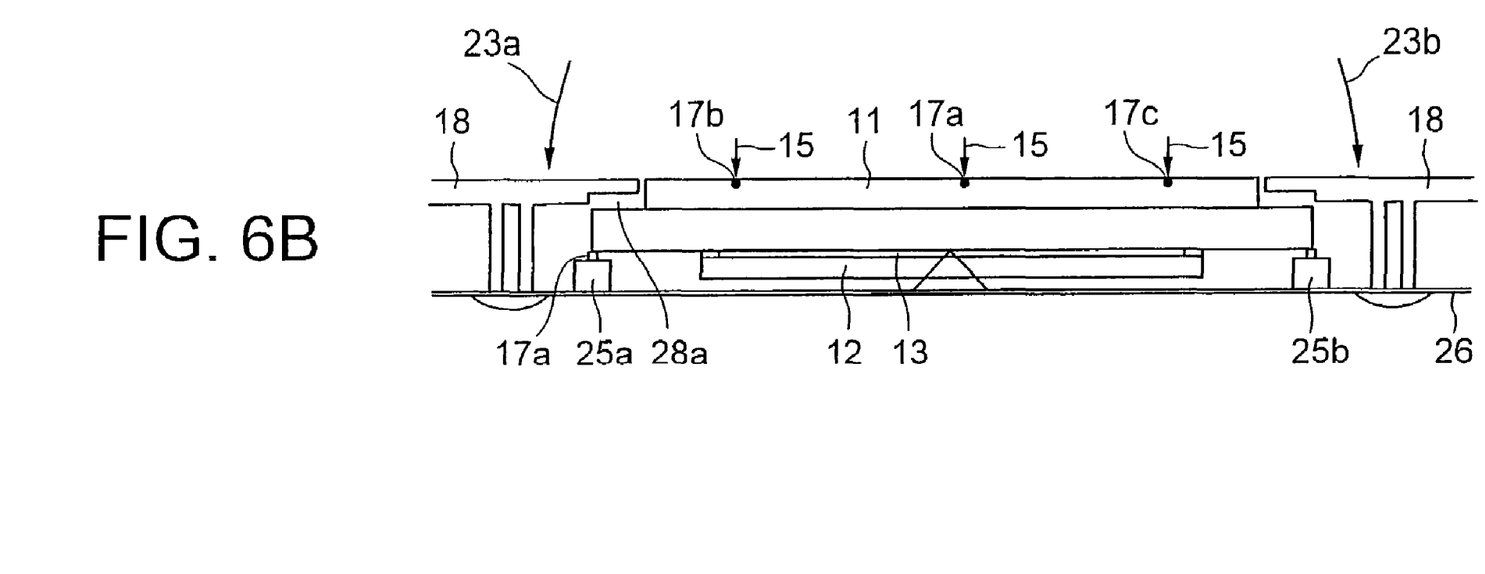

Referring to FIGS. 6A to 6C, there are shown swiveling directions of the LCD module 10A of the present embodiment by arrows 23a and 23b.

If an external force 15 is applied to the LCD module onto a point 17a of the front panel 11 near the swivel axis X—X, the LCD module 10A stays at the normal position due to a small moment around the swivel axis X—X. The applied force is transferred onto the casing 18 and/or substrate 26. The sufficient thickness of the front panel 11 allows the rear panel 12 and the LC layer 13 to be substantially free from deformation. If a pair of external forces 15 are applied at both points 17b and 17c so that both the external forces 15 cancel the moment of each other with respect to the swivel axis X—X, the LCD module 10A stays at the normal position as well.

Figure 7:
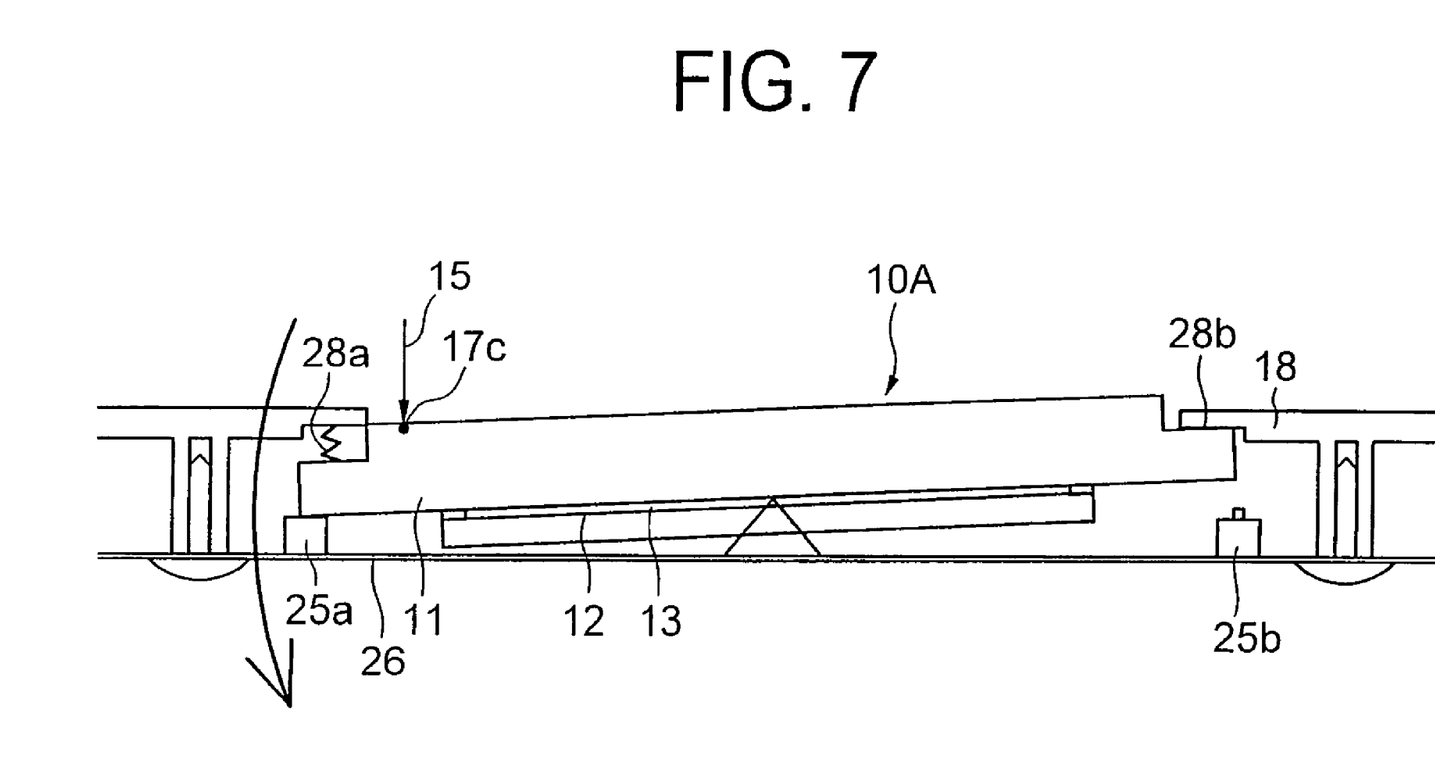
FIG. 7 is a bottom view of the combination switch of FIGS. 5A to 5C, showing an operational step.

For operating one of the changeover switches 25a and 25b, an external force 15 is applied onto the front panel at point 17b or 17c, which is well apart from the swivel axis X—X. The LCD module 10A is swiveled by the external force 15 in a seesaw function to allow one of the rear edges thereof to abut one of the changeover switches 25 and 25b, after breaking the mechanical balance between the springs 25a and 25b, as shown in FIG. 7. Each switch 25a or 25b has an inherent function for switching the image on the LCD module 10.

The front panel 11 may be made of any of glass or plastic resin materials for achieving a variety of shapes for the flange portion. The number of flange portions may be two or four in the front panel, so long as the flange portions oppose each other.

In an alternative, a combination of top or bottom flange and a right or left flange may be formed in the front panel 11 if the flange portions are not used for swiveling the LCD module 10 and simply used for fixing.

The rear panel 12 may be either transparent or non transparent. The front panel 11 may have any shape such as a polygon. The LC layer 13 may be made of any LC materials or an organic electroluminescence material.

Figure 8A:
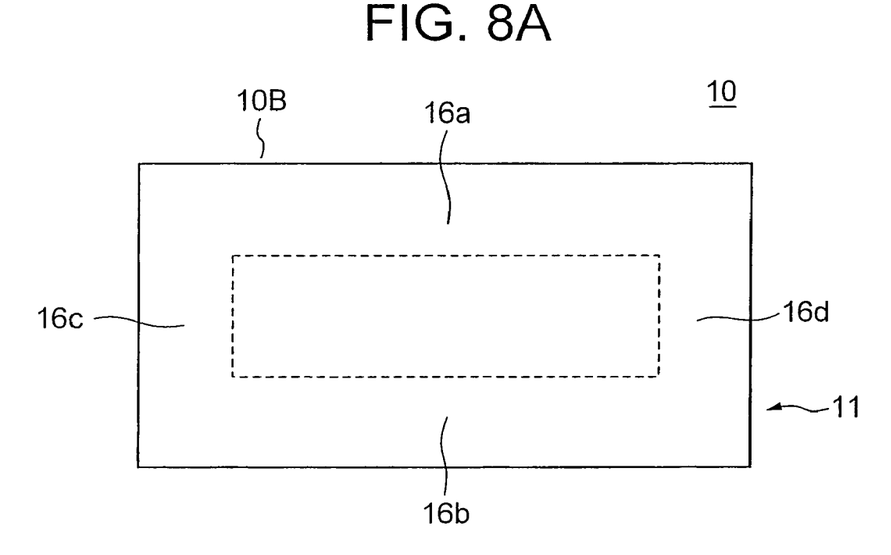
FIGS. 8A to 8C are a front view, a bottom view and a side view, respectively, of an LCD module according to a third embodiment of the present invention.
Figure 8B:
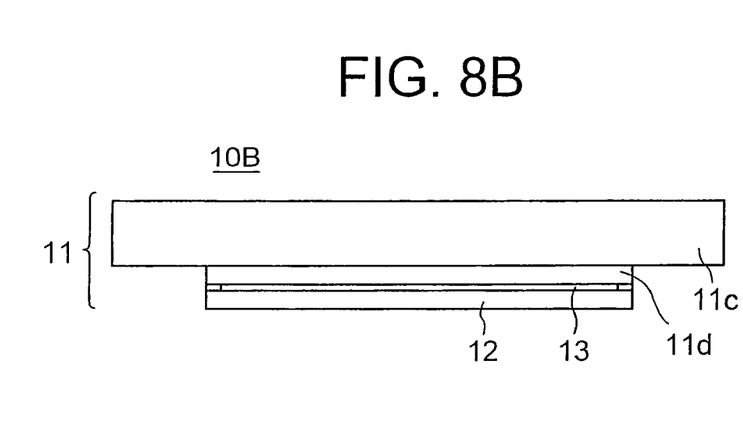
Figure 8C:
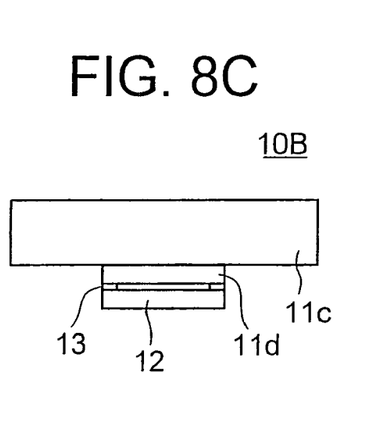

Referring to FIGS. 8A to 8C, an LCD module 10B according to a third embodiment of the present invention includes a front panel 11 having a first portion 11c and a second portion 11d, a rear panel 12, and an LC layer 13 sandwiched therebetween, wherein the first portion 11c has a larger thickness and functions as a protective overcoat for protecting the second portion 11d, the rear panel 12 and the LC layer 13 against an external load. The protective overcoat 11c also has a larger area than the area of the second portion 11d, the LC layer 13 and the rear panel 12, as viewed in the direction normal to the panels. The protective overcoat 11c has flange portions 16a–16d protruding from the edge of the second portion 11d in the direction parallel to the panels.

In the LCD module 10B of the present embodiment, the second portion 11d of the front panel 11 and the rear panel 12 have substantially the same thickness and the same dimensions. This structure allows the fabrication process to be simplified.

The combination switch structure having the LCD module of the present invention may be of a single-switch type or a slide-switch type other than the seesaw-switch type shown in FIGS. 5A to 5C.

Figure 9A:
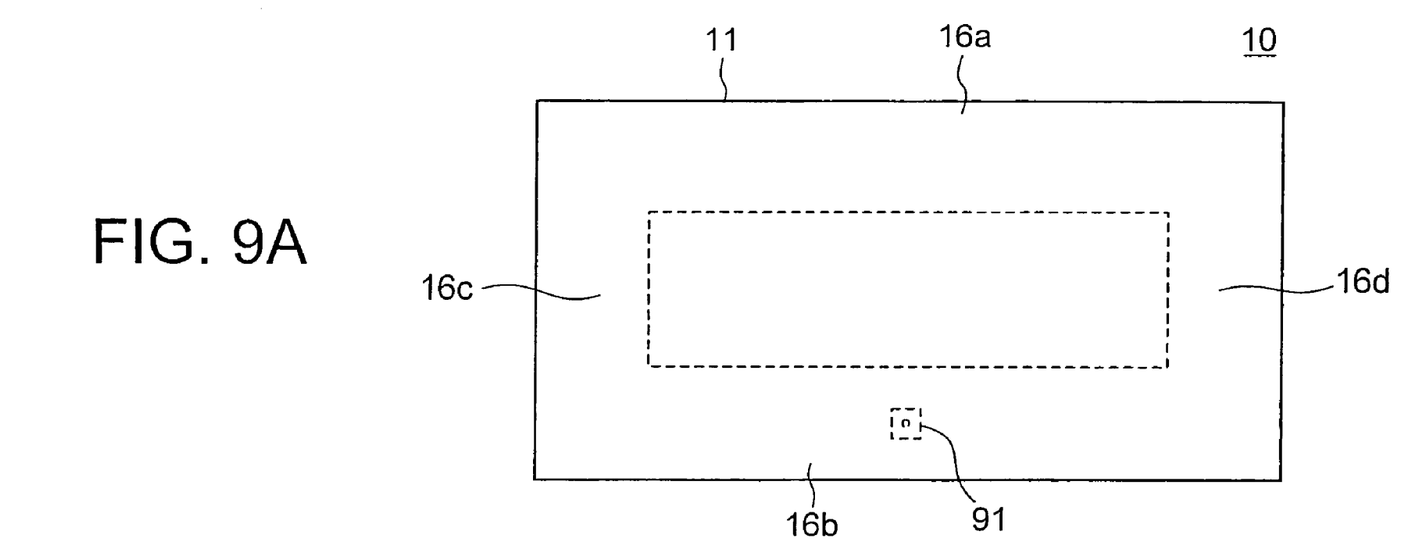
FIGS. 9A and 9B are a front view and a bottom view, respectively, of a combination switch including one of the LCD modules of the embodiments of the present invention.
Figure 9B:
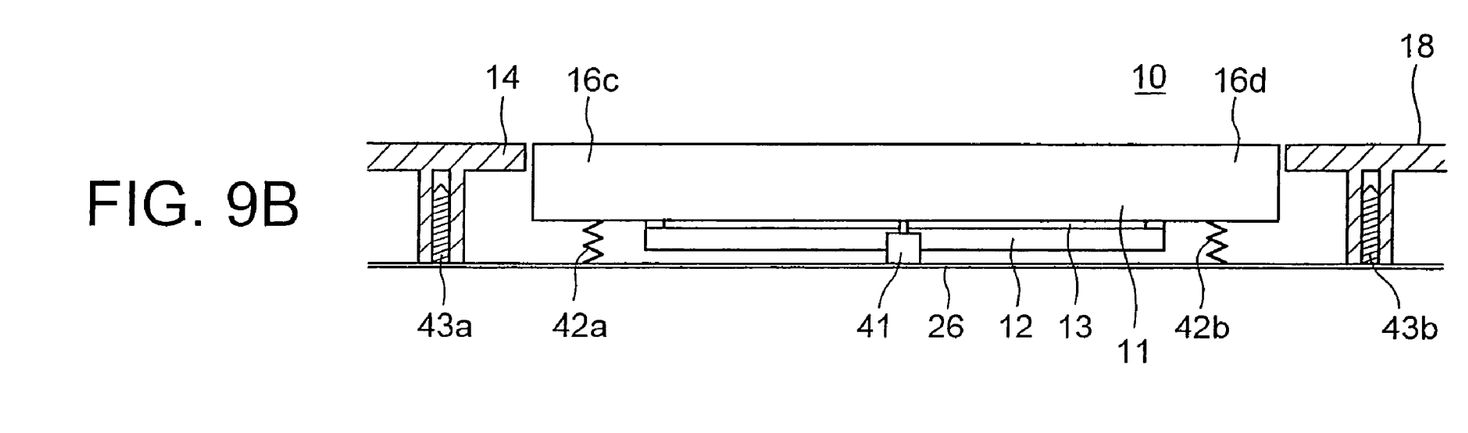

FIGS. 9A and 9B show a single-switch type combination switch structure having the LCD module 10 of FIGS. 1A to 1C. A pair of elastic members or springs 42a and 42b are provided between the flange portions 16c and 16d of the front panel 11 and the substrate 26 mounting thereon the LCD module 10, urging the LCD module 10 toward the front side. A changeover switch 41 is disposed at the center of the rear surface of the rear panel 12 so that the changeover switch 41 is in the normal state thereof by the function of the springs 42a and 42b. The casing 18 having an opening 14 for exposing the front panel 11 of the LCD module 10 is fastened to the substrate 26 by screws 43a and 43b.

In operation, when the LCD module 10 is pressed toward the rear side against the springs 42a and 42b, the changeover switch 41 is made on.

Figure 10A:
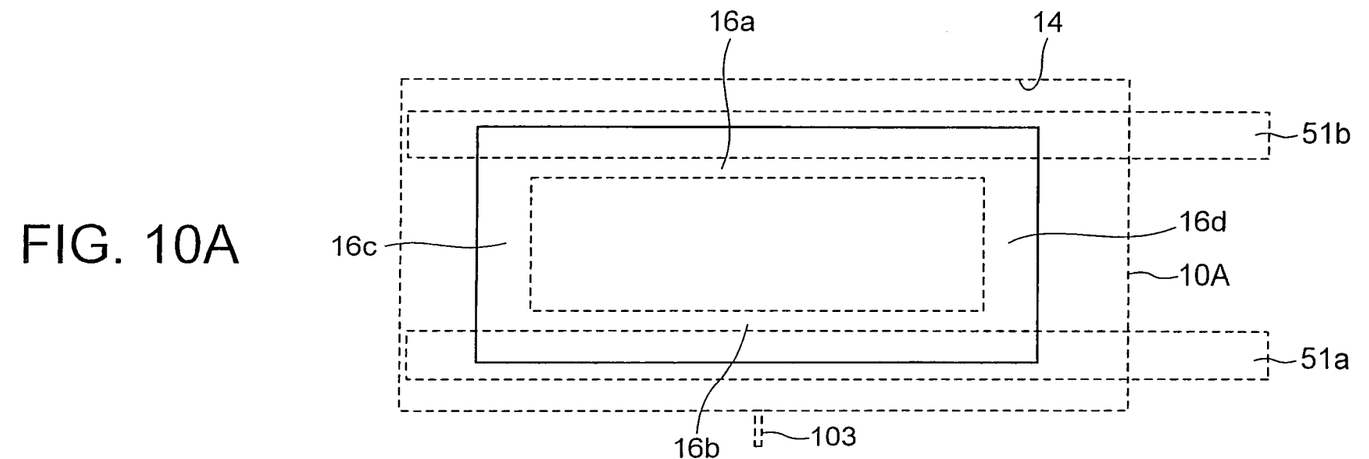
FIGS. 10A and 10B are a front view and a bottom view, respectively, of a combination switch including one of the LCD modules of the embodiments of the present invention.
Figure 10B:
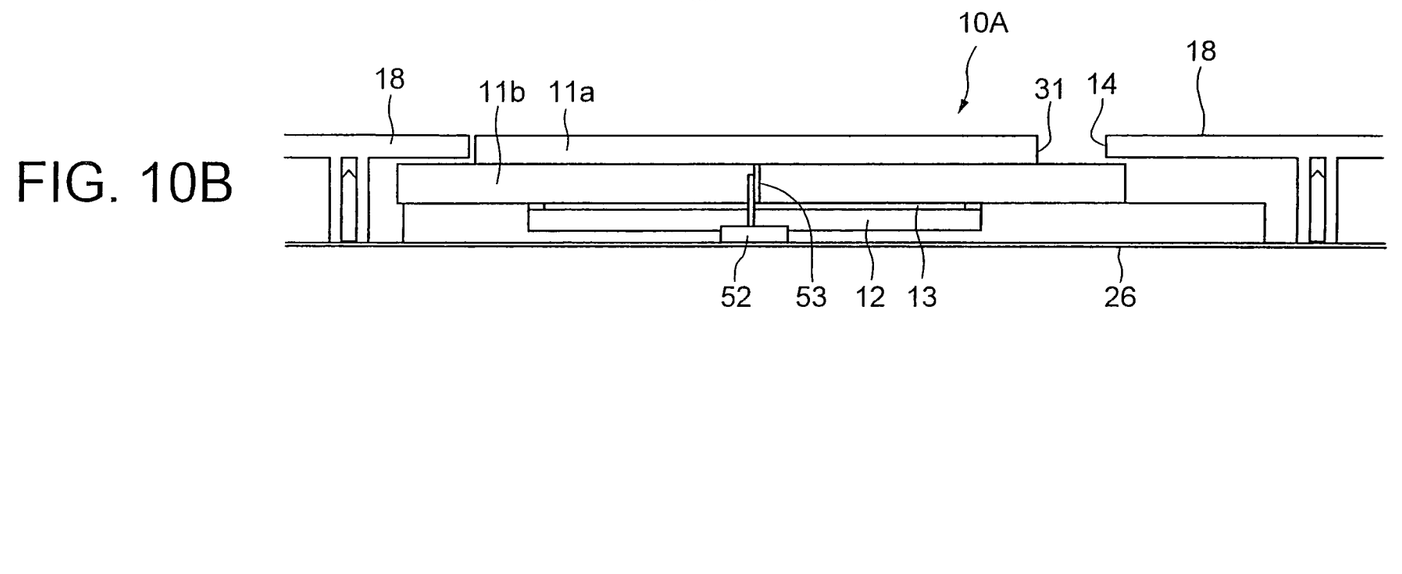

FIGS. 10A and 10B show a slide-switch structure having the LCD module 10A of the second embodiment.

The flange portions 16a and 16b of the LCD module 10A are mounted on a pair of guide rails 51a and 51b, which are fixed onto a substrate 26, so that guide rails 51a and 51b allows the LCD module 10A to slide between two positions at which the steps 31 of the flange portions 16c and 16d act as stoppers on the edges of the opening 14. The LCD module 10A has a lever 53 which forces the switch 52 to make open or close during the slide movement of the LCD module 10A between the stoppers.

The sufficient thickness of the front panel 11 protects the LC layer 13 and the rear panel 12 against the external force for shifting the LC module 10A between the stoppers.

Since the above embodiments are described only for examples, the present invention is not limited to the above embodiments and various modifications or alterations can be easily made therefrom by those skilled in the art without departing from the scope of the present invention.

What is claimed is:

1. A combination switch structure comprising:
   a liquid crystal (LCD) module including a transparent front panel, a rear panel and a liquid crystal (LC) layer sandwiched between said transparent front panel and said rear panel, said transparent front panel having a central area opposing areas of said LC layer and said rear panel and a peripheral area extending from said central area;

a casing inside which said LCD module is movably mounted; and a switch member operated by a movement of said peripheral area relative to said casing when said transparent front panel is applied with an external force.

2. The combination switch structure as defined in claim 1, further comprising at least one elastic member between said LCD module and said casing for urging said LCD module, wherein said switch member is pressed by pressing said transparent front panel against said elastic member.

3. The combination switch structure as defined in claim 2, wherein said at least one elastic member includes a pair of springs that are on respective opposite sides of said LCD module.

4. The combination switch structure as defined in claim 1, further comprising a guide member fixed with respect to said casing for guiding said LCD module along a surface of said casing, wherein said switch member is operated by a slide movement of said peripheral area relative to said casing.

5. The combination switch structure as defined in claim 1, further comprising a fulcrum that is between a bottom of said LCD module and said casing and that defines a pivot about which said LCD module moves relative to said casing in a rocking motion that operates said switch member.

6. The combination switch structure as defined in claim 5, wherein said switch member comprises two changeover switches that are located on respective opposite sides of said casing and that are operated by pressure thereon by respective opposite sides of the bottom of said LCD module when said LCD module is moved in the rocking motion.

7. The combination switch structure as defined in claim 1, wherein said switch member is operatively connected to change a display on said LCD module when said switch member is operated by moving said peripheral area relative to said casing.

* * * * *